(12) United States Patent
Sankruthi

(10) Patent No.: US 8,272,026 B1
(45) Date of Patent: Sep. 18, 2012

(54) METHOD AND APPARATUS FOR USING A DYNAMIC POLICY TO MANAGE A FILE PURGING PROCESS

(75) Inventor: Anand D. Sankruthi, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 1132 days.

(21) Appl. No.: 12/131,470

(22) Filed: Jun. 2, 2008

(51) Int. Cl.
*G06F 17/00* (2006.01)
*H04L 29/06* (2006.01)

(52) U.S. Cl. .......................................................... 726/1
(58) Field of Classification Search ................. 726/1
See application file for complete search history.

(56) References Cited

U.S. PATENT DOCUMENTS

| | | | | |
|---|---|---|---|---|
| 7,107,416 | B2 * | 9/2006 | Stuart et al. | 711/159 |
| 7,382,244 | B1 * | 6/2008 | Donovan et al. | 340/506 |
| 7,539,704 | B2 * | 5/2009 | Brodersen et al. | 1/1 |
| 7,904,689 | B1 * | 3/2011 | Carothers | 711/170 |
| 2004/0133540 | A1 * | 7/2004 | Saake et al. | 707/1 |
| 2006/0101384 | A1 * | 5/2006 | Sim-Tang et al. | 717/104 |
| 2006/0282629 | A1 * | 12/2006 | Stuart et al. | 711/159 |
| 2007/0130232 | A1 * | 6/2007 | Therrien et al. | 707/204 |
| 2008/0002830 | A1 * | 1/2008 | Cherkasov et al. | 380/277 |
| 2009/0070533 | A1 * | 3/2009 | Elazary et al. | 711/133 |
| 2010/0218167 | A1 * | 8/2010 | Turner et al. | 717/120 |

OTHER PUBLICATIONS

IBM TotalStorage SAN File System v2.2, File management policy syntax, downloaded from web site http://publib.boulder.ibm.com/infocenter/tssfsv21/index.jsp?topic=/com.ibm.sanfs22.doc/foe0_r_file_management_rule_syntax.html on Sep. 5, 2008. Copyright IBM Corporation 2003, 2004.
NCSA Purge Policy, downloaded from web site http://www.ncsa.uiuc.edu/UserInfo/Resources/Hardware/News/cobalt/ByName/Purge_Policy.html on Sep. 5, 2008. Copyright 2008 Board of Trustees of the University of Illinois.
CleanUp 2.4 Download, downloaded from web site http://www.brothersoft.com/cleanup-4527.html on Sep. 5, 2008. Copyright 2002-2008 BrotherSoft.com.

* cited by examiner

*Primary Examiner* — Kambiz Zand
*Assistant Examiner* — Benjamin Kaplan
(74) *Attorney, Agent, or Firm* — Campbell Stephenson LLP

(57) ABSTRACT

A method and apparatus for using a dynamic policy to manage a file purging process is described. In one embodiment, a method for using the dynamic policy to purge files comprising processing a dynamic policy for purging files from a computer wherein the dynamic policy comprises one or more metrics and applying the dynamic policy to a plurality of files to identify at least one file to be purged.

18 Claims, 4 Drawing Sheets

METHOD AND APPARATUS FOR USING A DYNAMIC POLICY TO MANAGE A FILE PURGING PROCESS

BACKGROUND OF THE INVENTION

1. Field of the Invention

Embodiments of the present invention generally relate to computer file purge management and, more particularly, to a method and apparatus for implementing a dynamic policy to manage a file purging process or session where a metric of the dynamic policy is extendible and/or modifiable.

2. Description of the Related Art

A computer (e.g., laptop, desktop, mobile computing device and the like) may store and process file data (e.g., a plurality of files) for one or more software applications (e.g., internet browsers, security software and the like). Because the computer has a limited amount of storage space, eventually the computer may operate slowly if the amount of storage space is low. The file data (e.g., cached browser files, security patches, signatures, updates and the like) may be stored in a separate directory until the separate directory reaches a threshold size, after which the file data is to be purged. The purging of the file data is a common process that may be initiated by the software application or an operating system to free storage space for future use by the computer.

Sometimes, the wrong file is purged (e.g., a security patch, an update to a software package and the like). For example, the wrong file may be a file that is frequently used during the operation of the computer and/or needed in the future. The wrong file may be purged because of the application of improper, static and/or outdated purge decision rules when a purging session is triggered. Therefore, the wrong file may be purged and/or the right file may be overlooked. Furthermore, undesired file deletions could be time consuming and expensive for the user if such files were downloaded, and due to the deletion, had to be downloaded again.

Therefore, there is a need in the art for method and apparatus for managing a file purging process using a dynamic policy that comprises a plurality of metrics, which are used to determine whether a particular file should be purged.

SUMMARY OF THE INVENTION

Embodiments of the present invention generally relate to a method and apparatus for using a dynamic policy to manage a file purging process. In one embodiment, a method for using the dynamic policy to purge files comprising processing the dynamic policy for purging files from a computer wherein the dynamic policy comprises one or more metrics and applying the dynamic policy to a plurality of files to identify at least one file to be purged.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
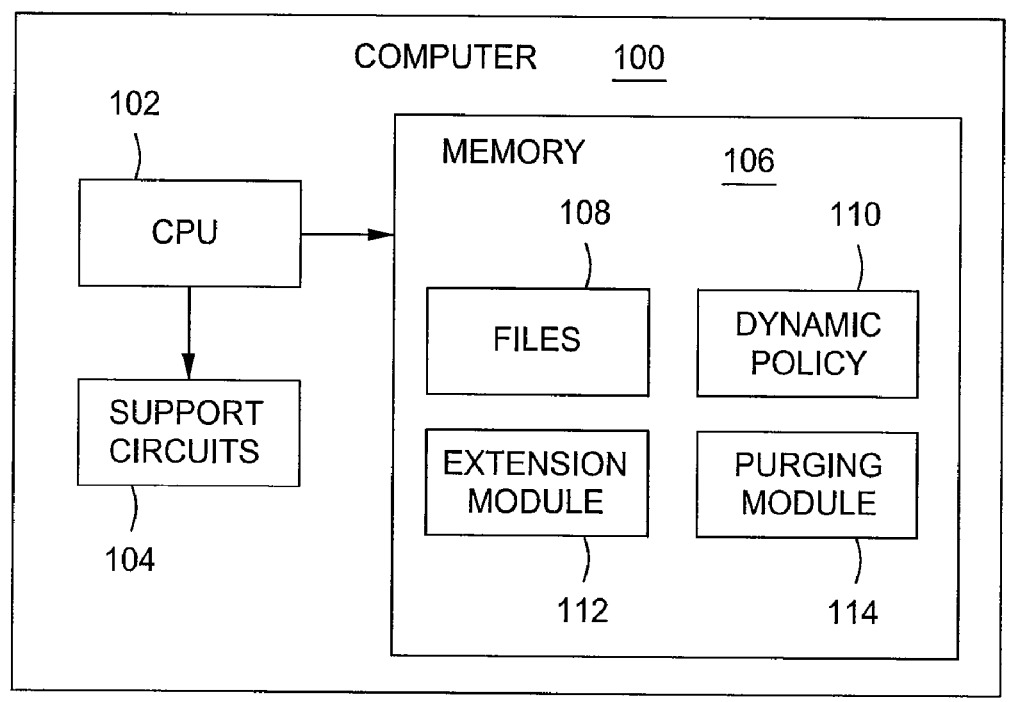
FIG. 1 is a block diagram of a computer for managing a file purging process using a dynamic policy according to one embodiment.

FIG. 1 is a block diagram of a computer 100 for managing a file purging process using a dynamic policy according to various embodiments of the present invention. It is appreciated that the computer 100 may also be a plurality of computers coupled to each other through a communication network (e.g., a local area network), in which various embodiment of the present invention manage a file purge process across the plurality of computers.

The computer 100 is a computing device (e.g., a laptop, a desktop, a Personal Desk Assistant (PDA), a tablet, a mobile phone and the like) that comprises a central processing unit (CPU) 102, various support circuits 104 and a memory 106. The CPU 102 may be one or more of any commercially available microprocessors or microcontrollers that facilitate data processing and storage. The various support circuits 104 facilitate operation of the CPU 114 and may include clock circuits, buses, power supplies, input/output circuits and/or the like. The memory 106 includes a read only memory, random access memory, disk drive storage, optical/magnetic storage, removable storage, and the like. Those skilled in the art will appreciate that the various embodiments of the computer 100 depicted in FIG. 1 may vary. For example, one or more embodiments of the computer 100 may also include various storage/processing devices (e.g., an optical disk drive, a computer graphics card, a magnetic data storage device and the like) as well as various input/output devices (e.g., a mouse, a keyboard, a computer display and the like).

The memory 106 further includes various data, such as a plurality of files 108 (herein referred to the files 108) and a dynamic policy 110. The memory 106 further includes various software packages, such as an extension module 112 and a purging module 114. The files 108 may include file data of interest to the user (e.g., temporary internet files, security patches, cached files, software application updates and the like). The files 108 may include file data for a software application patch (e.g., computer code for modifying the software application) that is downloaded onto the computer 100. The dynamic policy 110 may include a plurality of metrics whose values are used to determine whether a particular file (e.g., an executable file for a security patch, a software application update and the like) is to be purged during a purging session or process, as described further below.

In accordance with various embodiments of the present invention, the dynamic policy 110 is used to determine whether a particular file is to be purged based on values for a plurality of metrics (hereinafter referred to as metrics). In one embodiment, the metrics are defined in terms of various attributes (i.e., file system attributes, user-defined or extended attributes, attributes related to the files 108 and the like), such as "class ID", "file creation", "download duration", "time taken to virus scan", "result of installation", "num of times accessed", "file modified time", "file size", "last accessed time" and the like. In one embodiment, various measurements/statistics related to the various attributes (i.e., file system attribute data, metadata and/or the like) may be provided by information regarding the file system (e.g., a Master File Table (MFT), iNode information and the like), a file itself (e.g., file metadata), a computer hardware resource, a software application and/or an Application Programming Interface (API), such as an implementation of a COM-based (Component Object Model) interface associated with an operating system of the computer 100. For example, a file size for a particular file of the files 108 may be stored in the MFT of an operating system that is used by the computer 100.

The various measurements/statistics are used to determine the values for the metrics. In one embodiment, the values may include computed values based on measurements/statistics related to a file system attribute of a particular metric. A function may be applied to the measurements/statistics of the files 108 associated with a file system attribute to compute values that indicate one or more files likely to be purged during a file purging session. A higher value for the particular metric indicates a stronger likelihood that the particular file is to be purged.

In one embodiment, the computed values for the particular metric may be normalized (i.e., scaled down) to enable a fair comparison with values associated with another metric. For example, a value (i.e., non-normalized value) determined for the file size metric of a first file may be different from a value determined for the download duration metric of a second file. As such, normalization of the values facilitates an equitable determination as to whether the first file or the second file is to be purged first, if at all. In another embodiment, the values may include normalized values from a first number (i.e., one) to a second number (i.e., five) in which each value refers to a range of the measurements/statistics related to the file system attribute of the particular metric.

For example, the particular metric may be defined in terms of the file size attribute. Accordingly, file sizes ranges of the files 108 (e.g., zero kilobytes (0 kb) to hundred kilobytes (100 kb), hundred kb to one megabyte (1 mb), one mb to five mb and five mb to ten mb and ten mb to hundred mb) are assigned values that represent a likelihood or probability that a file associated with a particular file size range is to be purged. For example, the files 108 are assigned values from one through five based on which file size range corresponds to the file size of each file. Hence, a file with a file size within the file size range of zero kb to hundred kb is assigned the value one because files that fall within such a file size range may be most likely to be purged during a next file purging session or process. The assignment of the values with the file size ranges within the dynamic policy 110 may be defined or modified by the user (e.g., the system administrator). As an example, the system administrator may assign the file size range of zero kb to hundred kb with a value of five because the files 108 that fall within such a file size range are not likely to be purged with respect to a particular system managed by the system administrator. Since computers vary in many respects, certain computers may purge files differently than other computers. Furthermore, the system administrator may modify the file size range of zero kb to hundred kb into a file size range of zero kb to one mb.

In another embodiment, the particular metric in the dynamic policy 110 may be further defined by a purge order (e.g., decreasing, increasing and/or the like). The purge order may be pre-defined by an owner (e.g., a manufacturer of a file purging software) and/or defined or modified by the user (e.g., the system administrator). The purge order indicates an assignment of a value (e.g., a normalized value) to attribute data (e.g., a measurement/statistic or a range of measurements/statistics) related to the particular metric. In one embodiment, the purge order indicates an assignment of a normalized value to file system attribute data. For example, if the file size metric includes an increasing purge order, normalized values of five and one may be assigned to the file size range of zero kb to hundred kb (i.e., a lowest attribute data) and the file size range of ten mb to hundred mb (i.e., a highest attribute data), respectively. As another example, if the file size metric includes a decreasing purge order, the normalized values of one and five may be assigned to the file size range of zero kb to hundred kb (i.e., a lowest attribute data) and the file size range of ten mb to hundred mb (i.e., a highest attribute data), respectively.

In another embodiment, a weight may further define the particular metric by indicating an influence or importance of the particular metric on the determination of whether a file of the files 108 is to be purged. For example, a file size metric may be more important than a file creation metric in determining whether the file is be purged during the purging process. Hence, the file size metric is assigned a relatively greater weight than the file creation metric. Furthermore, each weight and/or each value for each metric in the dynamic policy 110 are used to compute a purge score for the file according to one embodiment. In one embodiment, a purge score is equal to (a first metric*a first weight)+(a second metric*a second weight)+ . . . (a nth metric*a nth weight). As explained below, the purge score indicates whether the file is to be purged.

In operation, after the dynamic policy 110 is generated and stored, the purging module 114 accesses the dynamic policy 110 and applies the metrics to the files 110 to compute purge scores based on the values and/or the weights associated with the metrics. In one embodiment of the present invention, the purging module 114 uses the purge scores to determine whether a file is to be purged. In another embodiment, the purging module 114 may compare a purge score of the file with one or more purge scores for one or more remaining files of the files 108.

Furthermore, the purging module 114 performs the purging process using the purge scores until a size of a directory reaches a lower threshold size. Moreover, the purging module 114 commences the purging process when a size of the directory reaches an upper threshold size. For example, if a maximum size of the directory is two gigabytes (gb), the upper threshold size of the directory is one gigabyte (gb) and the lower threshold size is five hundred mg (i.e., twenty-five percent), then the purging module 114 starts the purging process on the files 108 when a space occupied by the directory exceeds one gb. The purging process proceeds until at least five hundred mb of space is freed at which the purging module 114 stops the purging process.

In accordance the present invention, the extension module 112 is configured to add, define, remove and modify a metric, a value, a weight and/or a purge order to the metrics in the dynamic policy 110. In another embodiment, the dynamic policy 110 may be extended to include one or more user-defined metrics based on various data (e.g., metadata, file system attribute data and the like) as selected by the user (e.g., a system administrator). The user may also define and/or modify values for the user-defined metrics and/or any of the pre-defined metrics in the dynamic policy 110 through the extension module 112.

According to various embodiments of the present invention, the dynamic policy 110 may be described in one or more file formats (e.g., a config file format, a properties file format, a .INI file format and the like). In one embodiment, the dynamic policy 110 is implemented in accordance with an XML (Extensible Markup Language) format. XML is a general purpose specification for creating custom markup languages. In one embodiment of the present invention, the dynamic policy 110 is an XML document that describes the metrics used to determine if a file is to be purged. The XML document enables an extension and/or modification of the metrics through the extension module 112. Furthermore, the dynamic policy 110 may include indicia for identifying files, such as a particular folder name whose files are never or always to be purged. Moreover, the dynamic policy 110 may include indicia for determining when the purging process is triggered and/or stopped.

Below is an example of the dynamic policy 110 in the XML format:

```
<system>
<directory>C:\Patches</directory>
<maxsize>1GB</maxsize><selftrigger>true</selftrigger>
<lowerthreshold>50%</lowerthreshold>
<upperthreshold>90%</upperthreshold>
</system>
<exclusion_list>
<file>c:\Patches\ImportantPatch.exe</file>
<file>C:\Patches\*.dat</file>
<file>C:\Patches\MyPatches\*</file>
</exclusion_list>
<metrics>
<metric>
<name>DOWNLOAD_DURATION</name>
<purgeorder>DECREASING</purgeorder>
<weight></weight>
</metric>
<metric>
<name>FILE_SIZE</name>
<purgeorder>DECREASING</purgeorder>
<weight></weight>
</metric>
<metric>
<name>NUM_OF_TIMES_ACCESSED</name>
<purgeorder>DECREASING</purgeorder>
<weight></weight>
</metric>
<metric>
<name>LAST_ACCESSED_TIME</name>
<purgeorder>DECREASING</purgeorder>
<weight></weight>
</metric>
<metric>
<name>MY_OWN_METRIC</name>
<purgeorder>DECREASING</purgeorder>
<weight></weight>
</metric>
<metric>
<name>CLSID:{A9CF0EAE-901A-4739-A481-E35B73E47F6D}</name>
<purgeorder>DECREASING</purgeorder>
<weight></weight>
</metric>
</metrics>
```

The Items under the system tag provide information regarding which directory stores the files 108 and when a purging process (session) is to start. The directory tag refers to a file system path of the files 108. The maxsize tag defines a maximum size for the directory. The selftrigger tag indicates if a trigger for the purging process is manual (i.e., through an external application requesting the purging process and/or the like) or is automatic (i.e., through a file system notification API, such as FindFirstChangeNotification, FindNextChangeNotification, ReadDirectoryChanges and the like). The lowerthreshold tag defines a size of the directory until which the purging process may be performed once started. The upperthreshold tag defines a size of the directory until which the purging process may not be performed. The exclusion-list tag refers to one or more file paths\filenames for one or more file that are to be ignored during the purging process and are not to be deleted for any reason.

Figure 2:
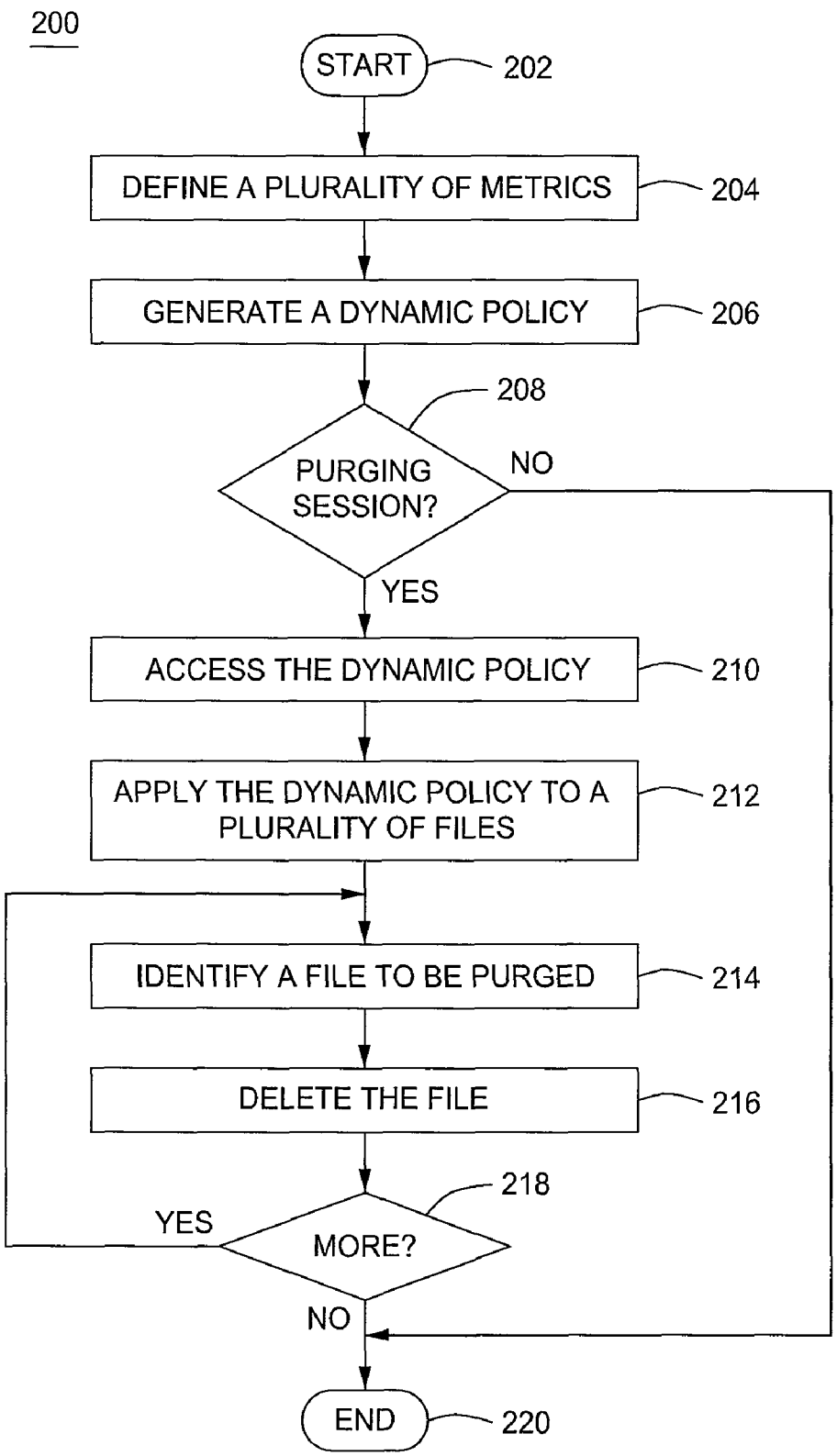
FIG. 2 is flow diagram of a method for managing a file purging process using a dynamic policy according to one embodiment.

FIG. 2 is flow diagram of a method 200 for managing a file purging process using a dynamic policy in accordance with the present invention. The method 200 begins at step 202, and proceeds to step 204 at which a plurality of metrics is defined.

At step 206, a dynamic policy (e.g., the dynamic policy 110 of FIG. 1) is generated. At step 208, a determination is made as to whether a file purging session is triggered. If the file purging session is triggered (option "Yes"), the method 200 proceeds to step 210 at which the dynamic policy is accessed. If the file purging session is not triggered (option "No"), the method 200 proceeds to step 220. At step 210, the dynamic policy is accessed. At step 212, the dynamic policy is applied to a plurality of files (e.g., the files 108 of FIG. 1). At step 214, a file to be purged is identified. At step 216, the identified file is deleted. At step 218, a determination is made as to whether there are more files to be purged. If there are more files to be purged (option "Yes"), the method 200 returns to step 214. If there are no more files to be purged (option "No"), the method 200 proceeds to step 220. At step 220, the method 200 ends.

Figure 3:
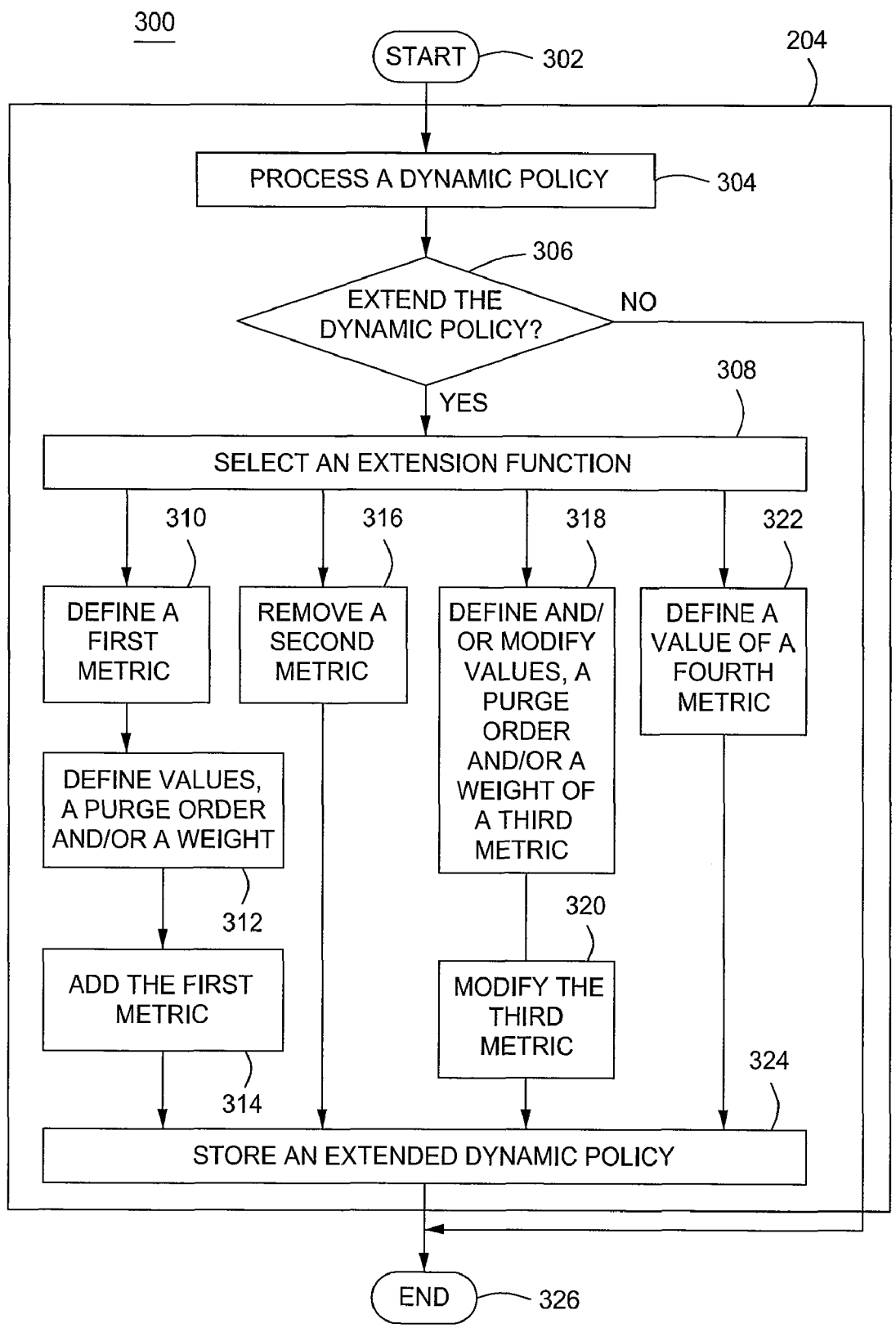
FIG. 3 is a flow diagram of a method for extending a dynamic policy according to one embodiment.

FIG. 3 is a flow diagram of a method 300 for extending a dynamic policy according to one embodiment of the present invention. The method begins at step 302 and proceeds to step 304 where a dynamic policy is processed.

At step 306, a determination is made as to whether the dynamic policy is to be extended. If the dynamic policy is to be extended (option "Yes"), the method 300 proceeds to step 308. If the dynamic policy is not to be extended (option "No"), the method 300 proceeds to step 326 where the method 300 ends. At step 308, an extension function is selected. As described above, extension functions are used to modify existing metrics and/or values as well as to define new metrics and/or values. In one embodiment, the extension functions are defined in an Application Programming Interface (API) generated by an extension module (e.g., the extension module 112 of FIG. 1). Alternatively, the extension functions may be used to extend or modify a policy rule.

At step 310, a first metric is defined (e.g., in terms of a file system attribute). At step 312, one or more values, a purge order and/or a weight for the first metric are defined. At step 314, the first metric is added to the dynamic policy. The steps 310 to 314 illustrate a first extension function (e.g., a set of computer instructions (code) in the API) of which the user executes to add the new first metric to the dynamic policy. Accordingly, the plurality of metrics and the new metric may be used to compute a purge score.

At step 316, a second metric is removed from the dynamic policy. The step 316 illustrates a second extension function of which the user executes to remove the second metric from the dynamic policy. In one embodiment, the second metric is removed by invoking the second extension function through the API in which the second extension function is defined. Accordingly, a purge score is computed using the plurality of metrics except for the second metric.

At step 318, one or more values, a purge order and/or a weight for a third metric of the plurality of metrics in dynamic policy are defined and/or modified. At step 320, the third metric of the plurality of metrics in the dynamic policy is modified. The steps 318 to 320 illustrate a third extension function of which the user executes to modify the third metric (e.g., modify a value, a purge order and/or a weight) of the plurality of metrics. In one embodiment, the third metric is modified through the API in which the third extension function is defined. Accordingly, a purge score is computed using the plurality of metrics that includes the modified third metric.

At step 322, a value for a fourth metric of the plurality of metrics in the dynamic policy is defined. The step 322 illustrates a fourth extension function of which the user executes to define the value of the fourth metric. In one embodiment, the value is assigned to a particular measurement/statistic or a range of measurement/statistics associated with the fourth metric. For example, a value for time periods greater than five minutes for a download duration metric is defined to be one. In one embodiment, the value of the fourth metric is defined through the API in which the fourth extension function is implemented. Accordingly, a purge score is computed using the plurality of metrics that includes the defined value for the fourth metric.

The steps 310 to 322 are illustrative of the techniques in which the dynamic policy may be extended. The user may proceed in extending the dynamic policy by selecting any or all of the extension functions. At step 324, after the selection and execution of one or more extension functions, an extended dynamic policy is stored. The method 300 ends at step 326.

Figure 4:
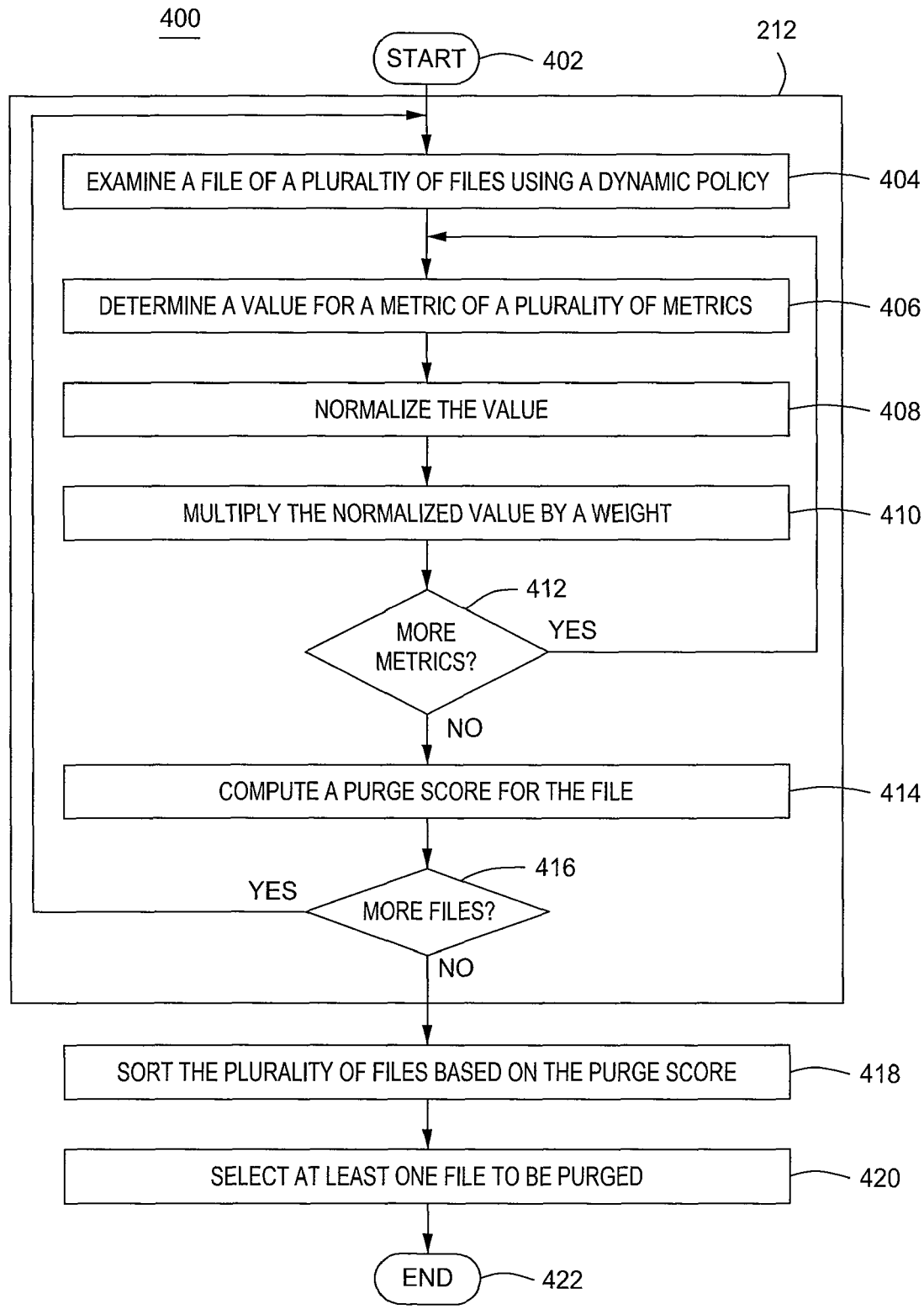
FIG. 4 is a flow diagram of a method for identifying a file to be purged according to one embodiment.

FIG. 4 is a flow diagram of a method 400 for identifying a file to be purged. The method begins at step 402 and proceeds to step 404 where a file of a plurality of files (e.g., the files 108 of FIG. 1) is examined using a dynamic policy (e.g., the dynamic policy 110 of FIG. 1). The dynamic policy is employed to examine a plurality of files to determine if any of the plurality of files is to be purged during a file purging session or process. Steps 406 to 416 represent an embodiment of the step 212 of FIG. 2.

At step 406, a value for a metric of the plurality of metrics is determined. In one embodiment, the value is determined based on attribute data (e.g., measurements/statistics related to a file system attribute). In another embodiment, the attribute data is divided by a number to produce attribute data ranges. For example, file sizes for the plurality of files are divided into five ranges in which each file size range comprises an equal number of files of the plurality of files. At step 408, the value is normalized. The normalized value ensures an equitable comparison between various metrics. At step 410, the normalized value is multiplied by a weight associated with the metric. At step 412, a determination is made as to whether there are more metrics in the plurality of metrics. If there are more metrics (Option "Yes"), the method 400 returns to step 406. If there are no more metrics (Option "No"), the method 400 proceeds to step 414.

At step 414, a purge score for the file is computed. At step 416, a determination is made as to whether there are more files in the plurality of files. If there are additional files to be examined (Option "Yes"), the method 400 returns to step 404. If there are no more files to be examined (Option "No"), the method 400 proceeds to step 418. At step 418, the plurality of files are sorted (i.e., ranked) based on the purge score of each file. In one embodiment, the ranking is then used to determine if a file needs to be deleted or retained in a current purging session. At step 420, one or more files of the plurality of files are selected to be purged. At step 422, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
accessing a dynamic policy for purging files from a computer, wherein the dynamic policy comprises a first metric and a second metric;
assigning first scores to one or more of a plurality of files, wherein the first scores are assigned using the first metric;
assigning second scores to the one or more of the plurality of files, wherein the second scores are assigned using the second metric;
calculating a purge score of the one or more the plurality of files, wherein
the purge score of each of the one or more of the plurality of files is based on the first scores and the second scores of the one or more of the plurality of files,
a first weight is associated with the first metric,
a second weight is associated with the second metric,
the calculating the purge score comprises calculating a weighted average of the first scores and the second scores of the one or more of the plurality of files, and
the calculating the weighted average uses the first weight for the first scores, and the second weight for the second scores, for the each of the one or more of the plurality of files; and
identifying at least one file of the plurality of files to be purged by applying the dynamic policy to the plurality of files, wherein
the applying uses the purge score of the one or more of the plurality of files purging said at least one file.

2. The method of claim 1, further comprising
defining the first metric based on at least one file system attribute.

3. The method of claim 1, further comprising
adding a third metric to the dynamic policy, and
assigning third scores to the one or more of the plurality of files, wherein the third scores are assigned using the third metric, wherein
in response to the adding, the calculating the purge score is further based on the third scores.

4. The method of claim 1, further comprising
removing the second metric from the dynamic policy, wherein
in response to the removing, the calculating the purge score is not based on the second scores.

5. The method of claim 1, wherein processing the dynamic policy further comprises
modifying the second metric.

6. The method of claim 1, further comprising
defining at least one value of the second metric.

7. The method of claim 1, wherein
the first scores are assigned using the first metric such that each of the one or more of the plurality of files is associated with one of the first scores,
the first scores are assigned to the each of the one or more of the plurality of files based on a distribution pattern.

8. The method of claim 7, wherein
the distribution pattern indicates a distribution of scores among the each of the one or more of the plurality of files.

9. The method of claim 1, wherein
assigning the first scores comprises
normalizing the first scores.

10. The method of claim 1, wherein
applying the dynamic policy comprises
computing a purge score for the first file of the plurality of files based on the first score associated with the first file and a first weight associated with the first metric.

11. The method of claim 7, wherein the identifying the at least one file comprises
sorting the one or more of the plurality of files based on the plurality of purge scores, wherein the sorting generates a sorted list of files; and
selecting the at least one file to be purged from the sorted list of files.

12. An apparatus comprising:
one or more processors;
an extension module configured to
    define at least one metric for a dynamic policy, wherein the dynamic policy comprises
        a first metric, and
        a second metric; and
a purging module, executable by the one or more processors, configured to
    assign first scores to the one or more of a plurality of files, wherein the first scores are assigned using the first metric,
    assign second scores to the one or more of the plurality of files, wherein the second scores are assigned using the second metric,
    calculate a purge score of the one or more of the plurality of files, wherein
        the purge score of each of the one or more of the plurality of files is based on the first scores and the second scores of the one or more of the plurality of files,
        a first weight is associated with the first metric,
        a second weight is associated with the second metric,
        the purging module calculates the purge score of the one or more of the plurality of files by calculating a weighted average of the first scores and the second scores of the one or more of the plurality of files, and
        the purging module calculates the weighted average by using the first weight for the first scores, and the second weight for the second scores, for the each of the one or more of the plurality of files, and
    determine at least one file of the plurality of files to be purged based on the dynamic policy.

13. The apparatus of claim 12, wherein
the extension module defines the first metric based on at least one file system attribute.

14. The apparatus of claim 12, wherein
the extension module is further configured to
    add a first metric to the at least one metric to extend the dynamic policy, and the purging module is further configured to
    assign third scores to the one or more of the plurality of files,
    assign the third scores using the third metric, and
    in response to the extension module adding the first metric, calculate the purge score further based on the third scores.

15. The apparatus of claim 12, wherein
the extension module is further configured to
    remove the second metric from the dynamic policy, and
the purging module is further configured to
    in response to the removing, calculate the purge score without using the second scores.

16. The apparatus of claim 12, wherein
the extension module is further configured to
    modify the second metric.

17. The apparatus of claim 12, wherein
the extension module is configured to
    define at least one value of the second metric.

18. A system for using a dynamic policy to purge files, comprising:
a first computer comprising a plurality of files; and
a second computer coupled to the first computer, comprising:
    an extension module configured to define at least one metric for a dynamic policy,
    wherein the dynamic policy comprises
        a first metric, and
        a second metric, and
    a purging module configured to
        assign first scores to one or more of the plurality of files, wherein the first scores are assigned using the first metric,
        assign second scores to the one or more of the plurality of files, wherein
        the second scores are assigned using the second metric,
        calculate a purge score of the one or more of the plurality of files, wherein
            the purge score of each of the one or more of the plurality of files is based on the first scores and the second scores of the one or more of the plurality of files,
            a first weight is associated with the first metric,
            a second weight is associated with the second metric,
            the purging module calculates the purge score of the one or more of the plurality of files by calculating a weighted average of the first scores and the second scores of the one or more of the plurality of files, and
        identify at least one file of the plurality of files to be purged based on the dynamic policy.

* * * * *